(12) United States Patent
Flaherty (10) Patent No.: US 8,047,200 B1
(45) Date of Patent: Nov. 1, 2011

(54) HYBRID SOLAR HEATING SYSTEM

(76) Inventor: B. Michael Flaherty, Stuart, FL (US)

( * ) Notice: Subject to any disclaimer, the term of this patent is extended or adjusted under 35 U.S.C. 154(b) by 163 days.

(21) Appl. No.: 12/592,085

(22) Filed: Nov. 19, 2009

(51) Int. Cl.
  *F24J 2/30* (2006.01)
  *F24J 2/24* (2006.01)

(52) U.S. Cl. ........ 126/612; 126/609; 126/628; 126/569; 122/31.1; 165/287

(58) Field of Classification Search ........ 126/612, 126/615, 588, 640, 652, 655, 656, 658, 688, 126/589, 591, 609, 585, 583, 572, 569, 610, 126/705; 122/31.1, 32
  See application file for complete search history.

(56) References Cited

U.S. PATENT DOCUMENTS

| | | | | |
|---|---|---|---|---|
| 761,596 A | * | 5/1904 | Moss | 126/646 |
| 2,167,576 A | * | 7/1939 | Kiser | 126/590 |
| 2,213,894 A | * | 9/1940 | Barry | 126/592 |
| 2,318,913 A | * | 5/1943 | Aldrich | 122/32 |
| 2,402,326 A | * | 6/1946 | Harkness | 126/658 |
| 2,920,874 A | * | 1/1960 | Gardner | 165/140 |
| 3,266,566 A | * | 8/1966 | Huet | 165/145 |
| 3,612,657 A | * | 10/1971 | Sawyer | 359/296 |
| 3,853,114 A | * | 12/1974 | Gaydos, Jr. | 126/653 |
| 4,003,365 A | | 1/1977 | Wiegand et al. | |
| 4,014,314 A | * | 3/1977 | Newton | 126/626 |
| 4,086,911 A | * | 5/1978 | Futch | 126/591 |
| 4,108,157 A | * | 8/1978 | Gorniak | 126/586 |
| 4,108,373 A | * | 8/1978 | Chiapale et al. | 126/640 |
| 4,126,122 A | | 11/1978 | Bross | |
| 4,128,124 A | | 12/1978 | Worthington | |
| 4,149,525 A | * | 4/1979 | Prado | 126/654 |
| 4,154,657 A | * | 5/1979 | Dennen | 202/234 |
| 4,184,481 A | * | 1/1980 | Tornquist | 126/585 |
| 4,205,654 A | * | 6/1980 | Jones, III | 126/677 |
| 4,210,125 A | | 7/1980 | Fender | |
| 4,212,290 A | * | 7/1980 | Warnken | 126/684 |
| 4,233,958 A | * | 11/1980 | Heden | 126/607 |

(Continued)

FOREIGN PATENT DOCUMENTS

EP 466107 A1 * 1/1992

(Continued)

OTHER PUBLICATIONS

Wikipedia, Entry for "Smart Glass," Wikipedia.com Oct. 7, 2009 pp. 1-5.

*Primary Examiner* — Steven B McAllister
*Assistant Examiner* — Desmond Peyton
(74) *Attorney, Agent, or Firm* — Norman Friedland; Ronald Davidge (57) ABSTRACT

A hybrid solar heat collector within a translucent dome structure includes a tubular frame, forming a first fluid path, and a transverse hose winding in a spiral inside and outside alternating legs of the frame to form a second fluid path. The first fluid path is connected to a reservoir in which a heater that is turned on to heat a fluid in the first fluid path when its temperature falls below a threshold. The reservoir is located within the dome structure and is configured to readily heat the space within the dome structure, so that the freezing of fluids within the heat collector is prevented. The translucent dome structure is provided with a layer having an opacity that is increased in response to an increase in temperature above a different threshold level, so that the boiling of fluids within the heat collector is prevented.

19 Claims, 7 Drawing Sheets

U.S. PATENT DOCUMENTS

| | | | | |
|---|---|---|---|---|
| 4,235,680 | A | * | 11/1980 | Diggs ................................ 203/2 |
| 4,261,331 | A | * | 4/1981 | Stephens ........................ 126/599 |
| 4,267,826 | A | * | 5/1981 | Hitt, Jr. ......................... 126/647 |
| 4,291,674 | A | * | 9/1981 | Comte et al. ................... 126/592 |
| 4,341,204 | A | * | 7/1982 | Bloxsom ........................ 126/651 |
| 4,376,436 | A | | 3/1983 | Tacchi |
| 4,385,624 | A | * | 5/1983 | Miller ............................ 126/563 |
| 4,403,602 | A | | 9/1983 | Warden |
| 4,416,256 | A | | 11/1983 | Korwill |
| 4,423,605 | A | * | 1/1984 | Petrick et al. ................... 62/467 |
| 4,429,545 | A | | 2/1984 | Steinberg |
| 4,513,731 | A | * | 4/1985 | Campbell ..................... 126/646 |
| 4,537,180 | A | * | 8/1985 | Minor ............................ 126/640 |
| 4,564,003 | A | | 1/1986 | Iwanicki et al. |
| 4,869,234 | A | * | 9/1989 | Rapozo .......................... 126/656 |
| 4,947,825 | A | * | 8/1990 | Moriarty ........................ 126/685 |
| 5,103,802 | A | | 4/1992 | Thomason |
| 5,243,965 | A | * | 9/1993 | Maitland et al. ............... 126/512 |
| 6,062,029 | A | | 5/2000 | Doe |
| 6,244,062 | B1 | * | 6/2001 | Prado ............................ 62/235.1 |
| 7,870,855 | B2 | * | 1/2011 | Flaherty ......................... 126/651 |
| 2009/0268273 | A1 | * | 10/2009 | Powers et al. .................. 359/288 |

FOREIGN PATENT DOCUMENTS

| | | | | |
|---|---|---|---|---|
| GB | 2076142 | A | * | 11/1981 |
| GB | 2101736 | A | | 1/1983 |
| JP | 56068747 | A | * | 6/1981 |
| JP | 60014052 | A | * | 1/1985 |
| WO | WO 8302659 | A1 | * | 8/1983 |
| WO | WO 8402176 | A1 | * | 6/1984 |
| WO | WO 2005/003643 | A1 | | 1/2005 |

* cited by examiner

HYBRID SOLAR HEATING SYSTEM

RELATED APPLICATIONS

Not Applicable

FEDERALLY SPONSORED RESEARCH OR DEVELOPMENT

Not Applicable

BACKGROUND OF THE INVENTION

1. Field of the Invention

This invention relates to solar heat collecting apparatus, and, more particularly, to solar heat collecting apparatus in which a backup energy source, such as electricity, is used to heat a fluid under conditions of insufficient solar heating, and also in which an opacity of a translucent structure is controlled to prevent overheating of a fluid within the apparatus.

2. Summary of the Background Information

Solar heat collectors generally include translucent walls enclosing tubing in which a fluid, such as water, is circulated to absorb heat from direct sunlight striking the tubing and from the air held within the transparent walls, which is also heated by solar radiation. The solar heat collector may additionally include thermally conductive structures, such as metal fins and plates, which are arranged to absorb solar radiation and to transmit heat to the fluid. The transparent walls may be arranged as a dome, facing upward, and may further be arranged as a dome within a dome. A dome-shaped structure may be supported by a tubular frame through which a fluid flows to be heated.

One problem with conventional solar heat collectors arises from the fact that such systems are often used to heat water for household use in climates that are subject to freezing conditions. When freezing conditions last long enough, particularly at night while heating from solar radiation cannot occur, water within the solar heat collector may freeze, blocking the circulation within the tubing and possibly causing serious damage, such as bursting the tubing due to the expansion. To avoid such an occurrence, antifreeze is mixed with the water being circulated within the solar heat collector, lowering the freezing temperature of the resulting mixture to a level at which the lowest temperature expected to occur within the solar heat collector. Since the addition of an antifreeze to the water makes the water unsuitable for domestic use, the water heated within the conventional solar heat collector can only be used as an inlet to a heat exchanger, in which potable water is in turn heated by the solution of antifreeze in water circulating through the solar heat collector.

Another problem with conventional solar heat collectors arises from the fact that, under sunny and warm climatic conditions, particularly when there is little need for the heated fluid produced within the heat collector, temperatures within the solar heat collector may rise to a point at which damage is done, particularly if the fluid within the heat collector is brought to a boil.

SUMMARY OF THE INVENTION

In accordance with one aspect of the invention, a solar heat collector is provided, with the solar heat collector including a floor, a frame, a transverse hose, and a translucent dome structure. The frame includes a plurality of legs arranged in a circular pattern around a central axis. The plurality of legs includes equal numbers of inner legs and outer legs, which are alternately disposed around the circular pattern. The transverse hose includes an inlet end, facing outward for receiving an inward flow of a fluid, a central portion winding around the frame in a spiral pattern, and an outlet end, facing outward from the solar heat ecolledtor for providing an outward flow of the fluid. The central portion extends outside each of the inner legs and inside each of the outer legs.

Preferably, the plurality of legs includes an inlet/outlet leg and a plurality of interconnected legs, with each of the legs including first and second ends and a pair of tubes extending between the first and second ends of the leg. In each of the interconnected legs, the tubes are connected to one another at the first end of the leg, which is preferably the lower end of the leg. In the first end of the inlet/outlet leg, one of the tubes is connected to a tubular inlet section, providing for a flow of a fluid into a fluid path through the frame, while the other tube is connected to a tubular outlet section, providing the a flow of the fluid outward from the fluid path through the frame. At the second end of each leg, which is preferably the upper end, each tube is additionally connected to a tube within an adjacent leg, forming a path for a flow of the fluid through the frame. The ends of the inner and outer legs may be spaced from the central axis at different distances, with the frame consisting entirely of straight tubular sections and right angle connectors attached to one another to form the fluid path.

Preferably, the translucent dome structure includes an inner dome, an outer dome, and a space extending between the inner and outer domes. The transverse hose may include a stiffening structure, such as corrugations, bellows, or a helical structure, that allows the transverse hose to remain round, without collapsing, while being bent sharply.

In accordance with another aspect of the invention, a solar heat collector is provided with protection from overheating, which might otherwise result in the boiling of a fluid within the solar heat collector. The solar heat collector includes an exterior structure inclosing an interior space, a first tubular structure forming a first fluid path, and a variable opacity layer. The exterior structure includes a translucent portion, with the variable opacity layer extending adjacent to the translucent portion. The opacity of the variable opacity layer is increased in response to an increase in temperature within the interior space and decreased in response to a decrease in temperature within the interior space.

For example, the variable opacity layer includes a transparent electrode extending along each side of a sublayer having an opacity changed in response to an electrical field established between the translucent electrodes. Such an electrical field may be applied by switching circuit in response to a signal from a thermal sensor within the interior space. Alternately, the variable opacity layer may comprise a thermochromic coating.

In accordance with yet another aspect of the invention, a system is configured for providing hot water. The system includes an exterior structuring enclosing an interior space, a first tubular structure, a reservoir, a heater, a temperature sensor, an inlet tube, and an outlet tube. The exterior structures includes a translucent portion admitting sunlight into the interior space. The first fluid path is connected at one end to a source of water by an inlet tube and at the other end to the reservoir. The reservoir is connected to at least one fixture dispensing hot water by an outlet tube. The heater heats the fluid (water) within the reservoir when the temperature sensor provides a signal in response to sensing a temperature below a threshold level within the reservoir.

The system may additionally comprise an anti-scald valve, mixing water from the inlet tube with water from the outlet tube when the temperature within the outlet tube exceeds a threshold level and/or a variable opacity layer extending adjacent to the translucent portion of the exterior structure. Again, the opacity of the variable opacity layer is increased in response to an increase in temperature within the interior space and decreased in response to a decrease in temperature within the interior space.

The system may additionally include a second tubular structure, providing a second fluid path through the interior path. Such a second fluid path may be connected to a duct system circulating air within an air conditioning system, so that a portion of this air is heated within the second fluid path. Alternately, the second fluid path may be fluid pumping system pumping a heated fluid through heat exchangers to warm a structure, with a portion of the fluid being additionally heated within the second fluid path. In another version of this system, the second fluid path is connected to circulate a fluid used to provide heat within the generator of an absorption air conditioning system.

DETAILED DESCRIPTION OF THE INVENTION

Figure 1:
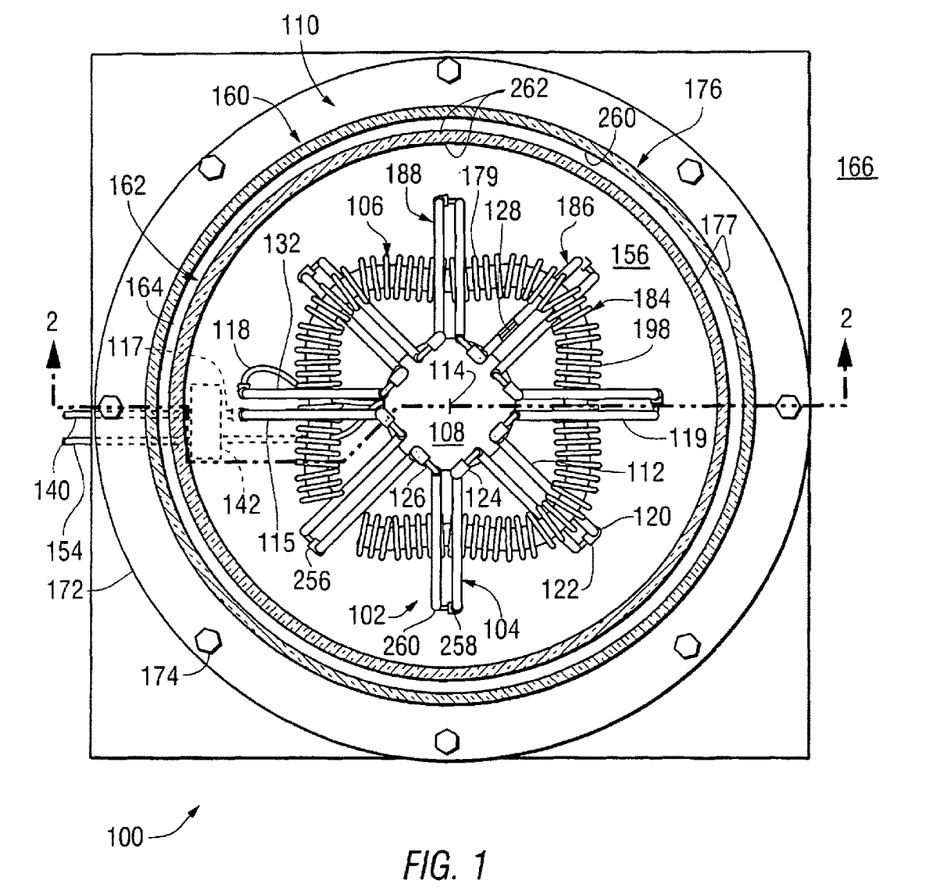
FIG. 1 is a plan view of a solar heat collector built in accordance with the invention.
Figure 2:
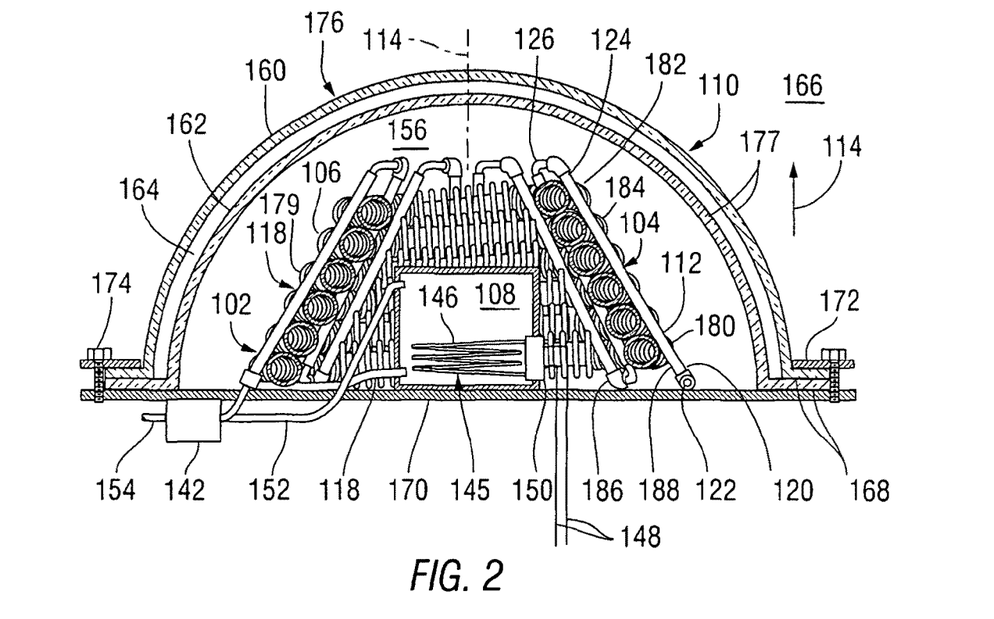
FIG. 2 is a cross-sectional elevation of the solar heat collector of FIG. 1, taken as indicated by section lines 2-2 therein.

A hybrid solar heat collector 100 built in accordance with the present invention will first be discussed with reference being made to FIGS. 1 and 2. FIG. 1 is a plan view of the hybrid solar heat collector 100, while FIG. 2 is a cross-sectional elevation thereof, taken as indicated by section lines 2-2 in FIG. 1. The hybrid solar heat collector 100 includes a frame 102 having a plurality of legs 104, a transverse hose 106 winding around the frame 102 and between the legs 104, and a reservoir 108, all held within a translucent dome structure 110.

Within the frame 102, each of the legs 104 includes a pair of tubes 112, disposed in a circular pattern 113 around a central axis 114 of the hybrid solar heat collector 100 and extending upward, in the direction of arrow 116 and inward, toward the central axis 114. The legs 104 include an inlet/outlet leg 115, in which the tubes 112 are connected to an inlet tube 117 and an intermediate tube 118, and a number of interconnected legs 119. In each of the interconnected legs 119, the tubes 112 are connected at a lower end 120 by connection elements 122. Tubes 112 within adjacent legs 104 are connected at an upper end 124 by connection elements 126, forming a first fluid path 128 extending through the frame 102 from the inlet tube 117 to the intermediate tube 118. In this way, various tubular elements are used both as tubes forming the first fluid path 128 and as struts forming the structure of the frame 102. It is understood that the connections between tubes 112 in individual legs 104 may alternately be made at the upper ends 124, with connections between tubes in adjacent legs 104 being made at the lower ends 120.

In a system heating water for domestic use, the first fluid path 128 within the inlet tube 130 is connected to an inlet water tube 140 through an anti-scald valve 142, and to the reservoir 108 through an intermediate tube 118. The reservoir 108 includes a heater 145, such as an electrical heating element 146 that is connected to an electrical inlet 148 in response to a thermal switch 150. A reservoir outlet tube 152 from the reservoir 108 is connected to an outlet water tube 154 through the anti-scald valve 142. For example, the thermal valve 150 is set to turn the heating element 146 on when the temperature of water within the reservoir 108 is below 90 degrees F., so that hot water can be provided under conditions in which heating by solar radiation alone is insufficient, and additionally so that a space 156 within the translucent dome structure 110 is sufficiently heated by the reservoir 108 to prevent the freezing of water in the first fluid path 128 through the frame 102. The anti-scald valve 142 senses the temperature of water flowing into the outlet water tube 154. When the temperature is below a potentially scalding level, such as, for example, 49 deg C. (120 deg F.), water flows from the inlet water tube 140 to the inlet tube 132 within the frame 104 and from the reservoir outlet tube 152 to the outlet water tube 154. When this temperature is at or above this potentially scalding level, water from the inlet water tube 140 is mixed with water from the reservoir outlet tube 152 within the anti-scald valve 142, with the resulting mixture being delivered through the water outlet tube 154.

The dome structure 110 includes an outer dome 160 and an inner dome 162, between which an air space 164 is provided to reduce a loss of heat from the space 156 to the surrounding atmosphere 166. Each of the domes 160 includes an outward extending flange 168, which is held in place on a floor 170 of the hybrid solar heat collector 100 by a clamping ring 172 fastened to the floor 170 with a number of screws 174. The dome structure 110 is an example of an exterior structure 176 including at least one translucent portion 177 and surrounding the interior space 156.

A central portion 179 of the transverse hose 106 is wound in a continuous, generally spiral, form around the frame 102 from a lower turn 180 to an upper turn 182, with a number of intermediate turns 184 extending therebetween. In FIG. 1, only one of these intermediate turns 184 is shown to provide a clear view of other elements within the hybrid solar heat collector 100. The legs 104 of the frame 102 include an equal number of inner frame legs 186 and outer frame legs 188, alternately disposed around the frame 102, with each turn 180, 182, 184 of the transverse hose 106 being alternately disposed outside the inner frame legs 186 and inside the outer frame legs 188. In general, the inner frame legs 186 and the outer frame legs 188 may be disposed outward from the central axis 114 through different distances to provide suitable angles of wrap for the transverse hose 106 around the inner frame legs 186 and the outer frame legs 188. In the example of FIGS. 1 and 2, the outer legs 188 are disposed farther away from the central axis 114 than the inner legs 186.

Figure 3:
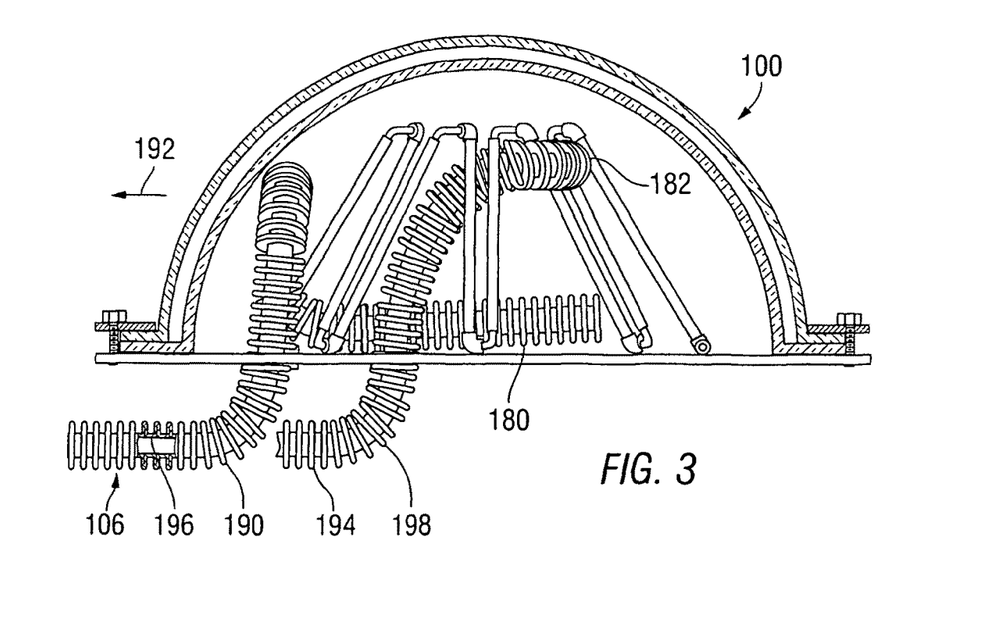
FIG. 3 is a fragmentary elevation of the solar heat collector of FIG. 1, showing portions of a transverse hose therein extending outward therefrom.
Figure 4:
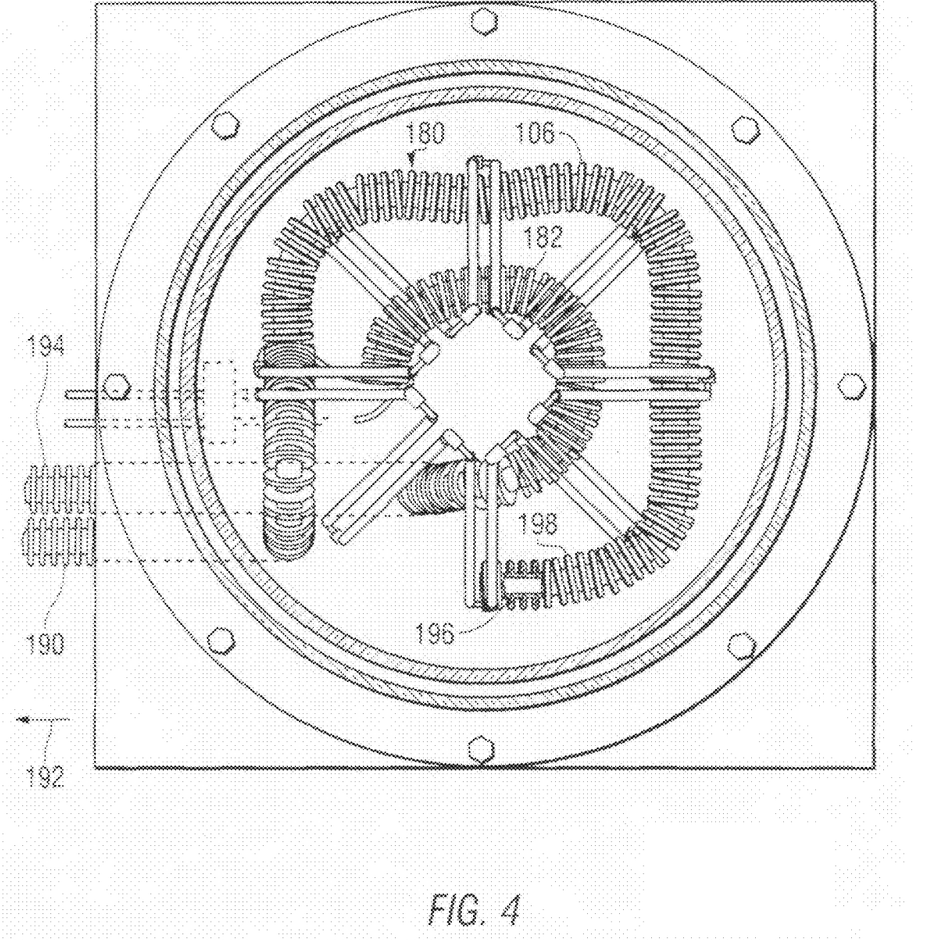
FIG. 4 is a plan view of the solar heat collector of FIG. 1, showing portions of a transverse hose therein extending outward therefrom.

FIGS. 3 and 4 show portions of the transverse hose 106 extending outward from the hybrid solar heat collector 100, with FIG. 3 being a fragmentary elevation, and with FIG. 4 being a fragmentary plan view. In both FIGS. 3 and 4, the translucent dome 110 is shown in cross-section to avoid obscuring the structures being shown. A first connection portion 190 of the transverse hose 106 extends outward, in the direction of arrow 192, from the lower turn 180, while a second connection portion 194 extends outward, additionally in the direction of arrow 192, from the upper turn 182. The transverse hose 106 forms a continuous second fluid path 196, through which a fluid can be pumped in either direction, with either the first connection portion 190 or the second connection portion 194 providing an inlet to the hybrid solar heat collector 100 while the other connection portion 190, 194 provides an outlet therefrom.

The transverse hose 106 is composed, for example, of a metal or thermoplastic material having an outwardly extending stiffening structure 198, such as corrugations, bellows, or a helical element extending along the transverse hose 106, which function to allow the transverse hose 180 to retain its circumferential stiffness (i.e. to remain round while avoiding collapsing) when the hose 106 is bent sharply. The transverse hose 106 may be formed as an integral plastic or metal tubular structure by molding or forming, or as a fabricated structure, such as a structure fabricated from a number of metal parts or a plastic tube attached to extend along a metal helical spring. This type of structure allows the transverse hose 106 to be of a diameter sufficiently large to permit the flow of a gas, such as air, through the transverse hose 106, to be heated directly within the hybrid solar heat collector 100 without a need for a separate path through which a liquid is pumped and a heat exchanger to heat the air from the liquid.

Figure 5:
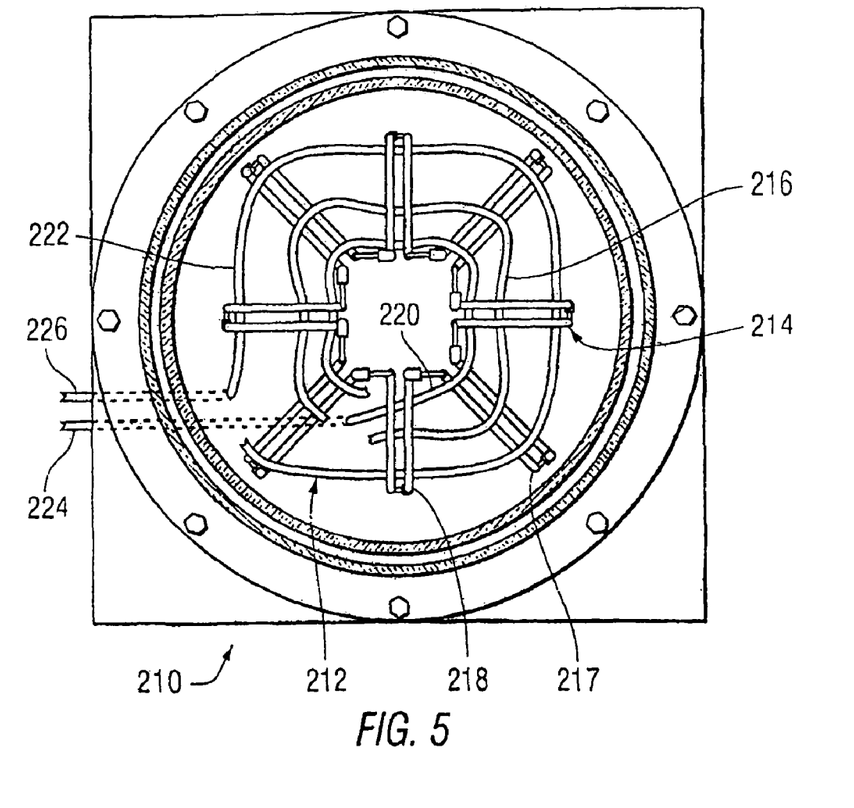
FIG. 5 is a fragmentary plan view of a solar heat collector built in accordance with the invention to include an alternate, smaller-diameter transverse hose.

The transverse hose 106 may additionally be used to heat a liquid, such as water, flowing at an appropriate speed through this hose 106. Alternately a smaller diameter hose may be used to carry a liquid. FIG. 5 is a fragmentary plan view of an alternative solar heat collector 210 built in accordance with the invention to include a smaller-diameter alternative transverse hose 212, which does not include the outwardly extending stiffening structure 198 of transverse hose 106. Like the transverse hose 106, the alternative transverse hose 212 is wound around a frame 214 in a number of turns 216, which are each disposed outwardly from a number of inner frame legs 217 and inwardly from a number of outer frame legs 218. For clarification, an upper turn 220 and a lower turn 222 of the alternative transverse hose 212 are shown in the drawing, with only one of a number of the intermediate turns 216 being shown. A first connection portion 224 of the alternative transverse hose 212 extends from the upper turn 220, while a second connection portion 226 thereof extends from the lower turn 222. When the frame 214 of the alternative solar heat collector 210 is compared to the frame 102 of the solar heat collector 100, it is noted that, in the frame 214, the outer frame legs 218 are displaced inwardly relative to the inner frame legs 217. This is necessary so that the smaller-diameter alternative transverse hose 212 can wrap partly around both the inner frame legs 217 and the outer frame legs 218.

Figures 6, 7:
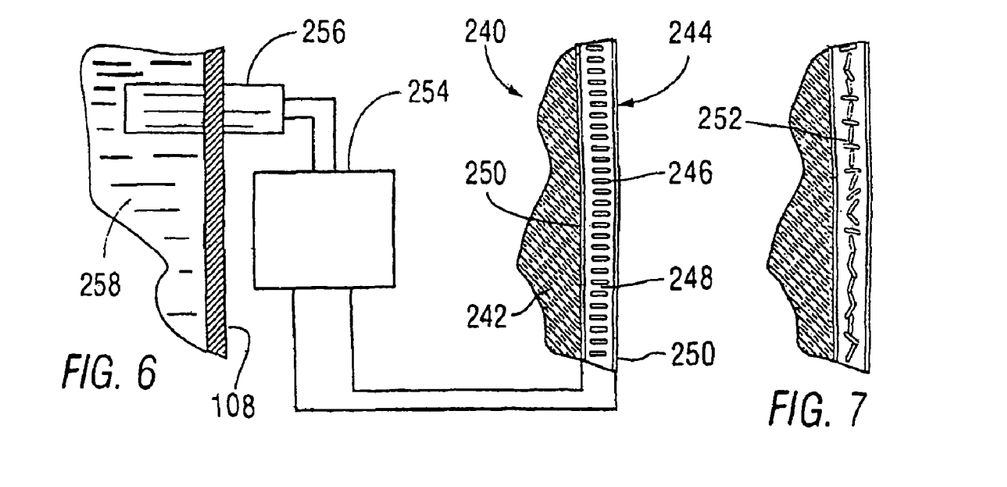
FIG. 6 is a partly schematic cross-sectional view of a switchable system for controlling the opacity of a dome structure within the solar heat collector of FIG. 1, shown in a transparent state.
FIG. 7 is a cross-sectional view of the switchable system of FIG. 6, shown in an opaque state.

In accordance with one version of the invention, the dome structure 110 is provided with a system, as shown in an exemplary form in FIGS. 6, and 7, for electrically switching its opacity, with the system being used to reduce the heating of fluids circulating within the solar heat collector 100 in response to a determination that at least one of these fluids has reached a maximum temperature. For example, such a system may be used to prevent the boiling of a fluid, such as water, within the solar heat collector 100 during conditions of bright sunlight and low levels of usage of the heated fluid. FIG. 6 is a schematic view of an electrically switchable system 240 for controlling the opacity of a dome section 242 through the use of a suspended particle device 244 in the form of a thin film laminate holding a number of rod-shaped particles 246 suspended within a fluid 248 between a pair of translucent and conductive electrode layers 250. When a voltage is applied between the electrode layers 250, the individual rod-shaped particles 246 align to extend perpendicular to the electrode layers as shown in FIG. 6, allowing the passage of light through the suspended particle device 244. When the voltage is no longer applied between the electrode layers 250, the individual rod-shaped particles 246 align randomly as shown in FIG. 7, forming an opaque layer 252 that blocks the transmission of light through the suspended particle device 244.

An electrical drive circuit 254 is provided to supply the necessary voltage between the electrodes 250, holding the rod-shaped particles 246 in alignment as shown in FIG. 6, so that light is transferred through the suspended particle device 244. For example, the electrical drive circuit 254 is additionally connected to a thermal sensor 256 extending into the reservoir 108. When the temperature of the water 258 within the reservoir 108 exceeds a threshold value, the thermal sensor 256 causes the electrical drive circuit 254 to stop supplying the voltage to the electrodes 250, so that the rod-shaped particles 246 move into the random distribution 252 of FIG. 7, blocking the transmission of light through the suspended particle device 244. When the water 258 has cooled sufficiently to switch the thermal sensor 256, the voltage is again supplied to the electrodes 250, so that the rod-shaped particles 246 again move into the aligned condition of FIG. 6.

Referring again to FIG. 1, the suspended particle device 244 is preferably applied to one or more of the surfaces within the dome structure 110 that are protected from the ambient environment. Such surfaces include the inner surface 260 of the outer dome 160, and either surface 262 of the inner dome 162.

Alternatively, the suspended particle device 244 may be replaced with a polymer dispersed liquid crystal device (PDLC), additionally configured as shown in FIG. 6, in which the fluid 248 containing rod-shaped particles 246 is replaced with a cured polymer in which liquid crystals have been dissolved or dispersed while the polymer was a liquid before curing. Then, during the process of curing or solidification of the polymer, the liquid crystals, being incompatible with the solid phase of the polymer, formed droplets throughout the solid polymer. When an electrical voltage is applied to the electrodes 250 by the electrical drive circuit 254, the liquid crystals are aligned to lie perpendicular to the electrodes 250, so that the PDLC is driven into a clear state, providing minimum resistance to the transmission of light through the dome structure 110. When the electrical voltage is no longer applied in this way, the liquid crystals become arranged in a random orientation, so that light traveling into the PDLC is scattered, reducing the amount of sunlight transmitted through the dome structure 110.

The suspended particle device 244 and the PDLC are both examples of devices requiring the application of at least a small electrical current to enter or maintain a clear state, in which sunlight is transmitted through the dome structure 110. A device of this type has an advantage of being fail-safe, in that a failure of the electrical drive circuit 254, which may, for example, be a failure of the electrical power being supplied to this drive circuit 254, will cause the device 244 to stay in, or revert to, an opaque state, in which sunlight is, at most, minimally transmitted through the dome structure 110, so that an over-temperature condition, which may lead to the boiling of a fluid, cannot occur. Then, if the electrical power used to operate the heater coils 146 were still available, these coils could additionally be used if required to prevent the freezing of a fluid.

It is understood that the dome structure 110 may alternately be provided with a system for electrically switching its opacity that remains in a clear state when electrical power is removed. While such a system would not have the advantage of fail-safe operation as described above, the usage of electrical power within such a system would be probably be reduced, since the threat of boiling a fluid due to operation at too high a temperature would not generally be present. In addition, the opacity-changing materials for such a system could be applied to dome structure 110 in which this feature will not initially be used, with a simple conversion for later use of this feature through the attachment of a switching circuit being then possible.

An example of a system that remains in a clear state when electrical power is removed is configured as shown in FIG. 6, with the suspended particle device 244 being replaced by an electrochromic device including a material capable of reversibly changing color when a burst of voltage is applied between the electrodes 250 by the electrical driving circuit 254. Such materials include tungsten oxide ($WO_3$), polyaniline, and polymer-based solutions having this property. Following the application of a burst of electrical energy, such materials remain in their clear or opaque states until another burst of electrical energy is applied to change them.

Figures 8, 9, 10:
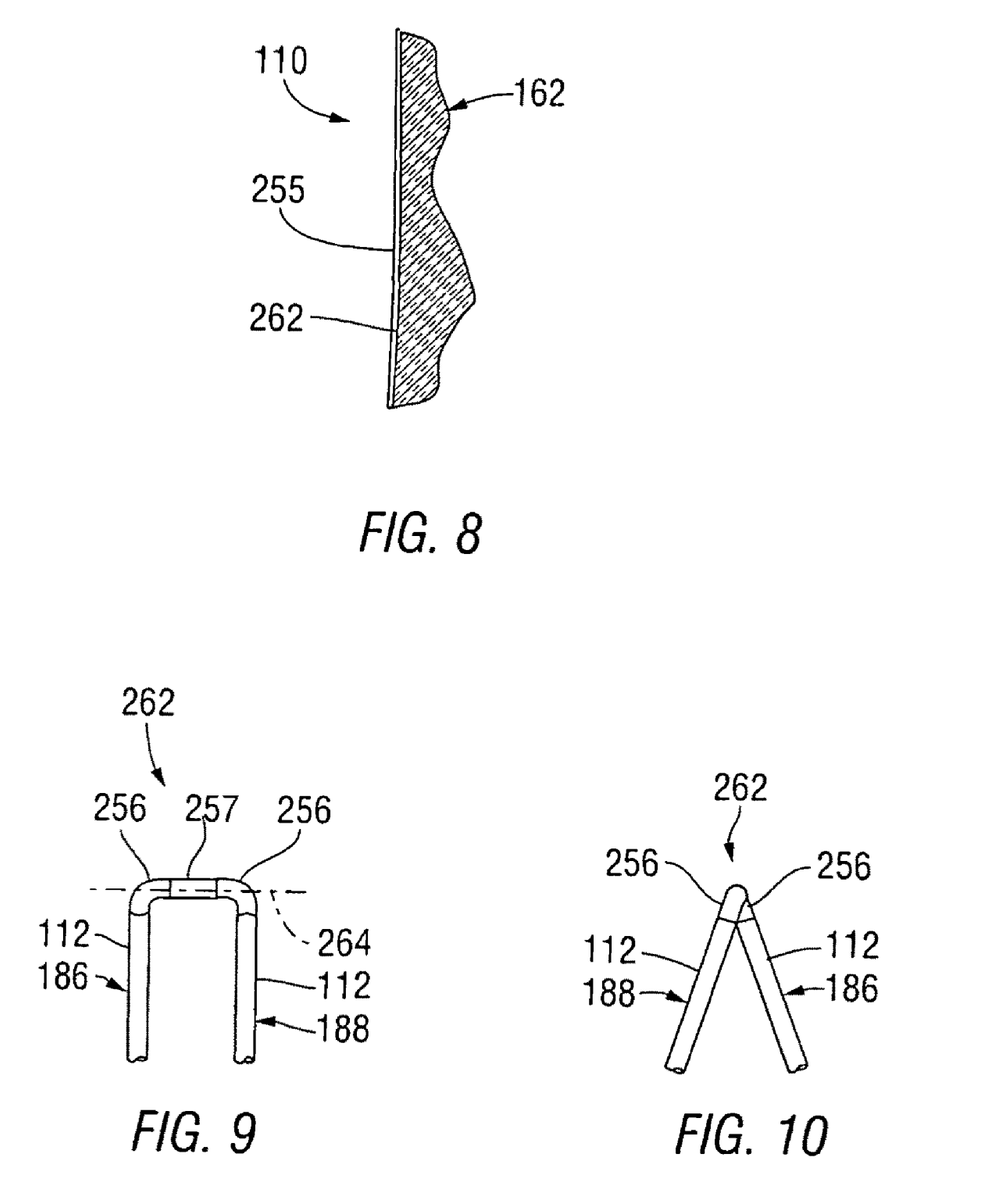
FIG. 8 is a fragmentary cross-sectional view of a dome within the solar heat collector of FIG. 1, showing an alternative method for controlling the opacity of the dome.
FIG. 9 is a first elevation of a connection between adjacent legs within a frame in the solar heat collector of FIG. 1.
FIG. 10 is a second elevation of a connection between adjacent legs within a frame in the solar heat collector of FIG. 1.

In another version of the invention, as shown in FIG. 8, the dome structure 110 is provided with a thermochromic coating, causing its opacity to vary in response to the temperature of the coating. In this way, protection of the fluids and structures within the dome structure 110 is provided without a need to provide electronic temperature sensing and switching. For example, the inner surface 262 of the inner dome 162 is coated with a layer 255 of a thermochromic material, such as vanadium dioxide, which transforms to a metal from a semiconductor, blocking the transmission of light, when a transition temperature is exceeded. Doping materials may be added to the layer 255 to adjust the transition temperature for suitable operation within the hybrid solar heat collector 100.

While the hybrid solar dome 100 has been described as having the first fluid path 128 filled with water being heated for domestic use, it is understood that the first fluid path 128 may be filled with another fluid, in the form of a liquid or a gas, that is heated for another purpose.

A preferred version of the invention, in which the frame 102 is composed entirely of straight tubes and right angle fittings, will now be discussed, with continued reference being made to FIG. 1, and with additional reference being made to FIGS. 9 and 10. First, as shown in FIG. 1, each of the legs 104 includes a pair of tubes 112, extending within a common plane, that are joined at their lower ends 120 by a pair of right-angle connections 256, which are, for example, elbow connections 258 and street connections 260.

FIGS. 9 and 10 are fragmentary elevations of the frame 102, showing the connection 262 between a straight tube 112 within an inner frame leg 186 and a straight tube 112 in an adjacent outer frame leg 188. FIG. 9 is taken in a direction perpendicular to an interconnection axis 264, which is perpendicular to both the straight tubes 112 in the inner frame leg 186 and the outer frame leg 188. FIG. 10 is taken in a direction which is parallel to the interconnection axis 264. It is noted that a pair of right angle connections 256 are connected to one another, optionally through a straight tube 257, share an interconnection axis 264 about which the connections 256 are connected. Each of the right angle connections 256 is again elbow connections 258 or street connections 260 (as shown in FIG. 1). In general, the interconnection axis 264 extends at an oblique angle relative to the central axis 114 of the hybrid solar heat collector 100.

Figure 11:
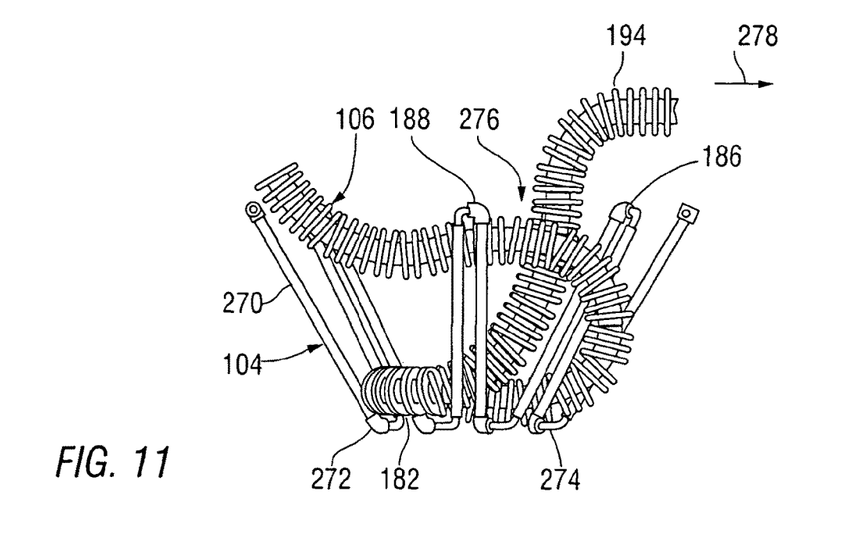
FIG. 11 is an elevation showing the winding of a transverse hose around a frame within the solar heat collector of FIG. 1.

FIG. 11 is an elevation showing the winding of a transverse hose 106 around the frame 104, with the frame 104 inverted to upwardly expose openings 270 between adjacent inner frame legs 186 and outer frame legs 188, the process of winding the transverse hose 106 begins with the upper turn 182, having the second connection portion 194 extending outward, in the direction of arrow 278. The transverse hose 106 is wound onto the frame 104 by being moved into the openings 276 to be disposed outside the inner frame legs 186 and inside the outer frame legs 188.

Figure 12:
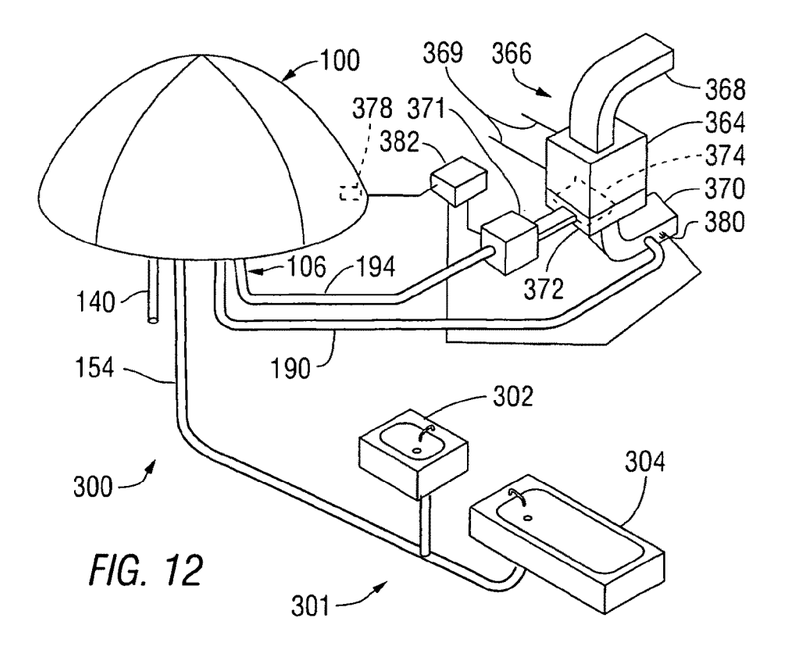
FIG. 12 is a schematic view of a system using heat collected within the solar heat collector of FIG. 1 to produce domestic hot water and to provide heated air for a heating system within a structure.
Figure 13:
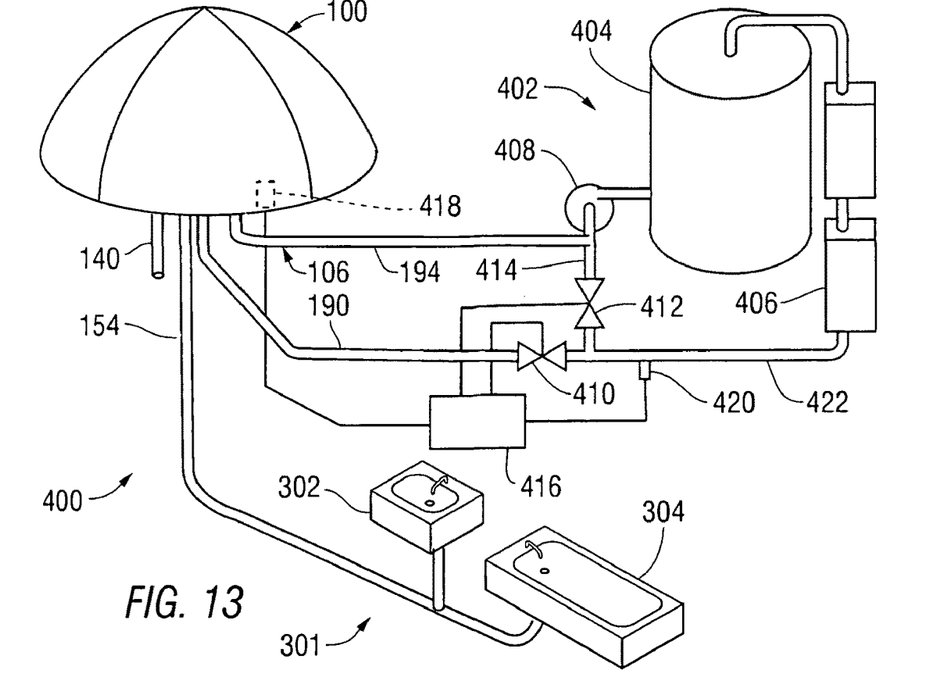
FIG. 13 is a schematic view of a system using heat collected within the solar heat collector of FIG. 1 to produce domestic hot water and to provide heated water for a heating system within a structure.
Figure 14:
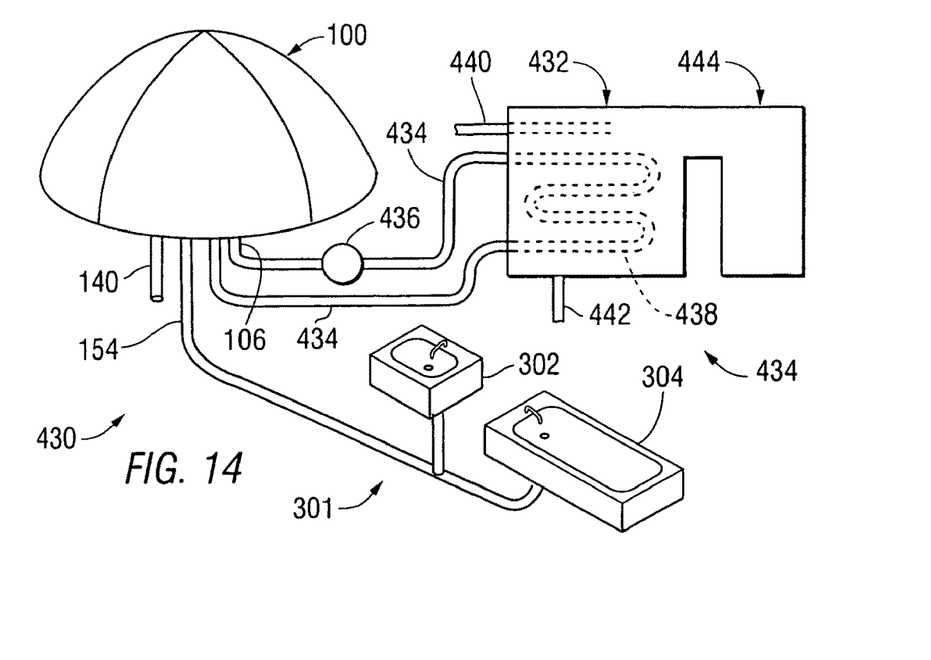
FIG. 14 is a schematic view of a system using heat collected within the solar heat collector of FIG. 1 to produce domestic hot water and to provide heat within an absorptive air conditioning system.

FIGS. 12-14 are schematic views of exemplary embodiments of a system using heat collected within the solar heat collector 100. In each of these exemplary embodiments, unheated potable water flows into the first fluid path 128, as described in detail above in reference to FIGS. 1 and 2, from an inlet tube 140, with heated water being delivered from the reservoir 108 through the outlet tube 154 to one or more fixtures 301 delivering hot water, such as a sink 302 and a bathtub 304. Features within the solar heat collector 100, again as described in reference to FIGS. 1 and 2, make it feasible to connect the outlet tube 154 directly to elements, such as the sink 302 and the bathtub 304, within a residence or other structure. In particular, the operation of heater coils 146 within the reservoir 108 provide suitably heated water even under conditions of prolonged inadequacy of solar radiation, and the anti-scald valve 142 mixes inlet water with water from the reservoir 108 whenever the water from the reservoir 108 becomes too hot. Additionally, as described above in reference to FIGS. 6 and 7, the optional use of a system for electrically switching the opacity of the dome structure 110 can provide additional protection against over-temperature conditions.

In the first exemplary system 300, shown in FIG. 12, the second fluid path 196 (shown in FIG. 4) is connected to an air conditioning system 366, so that a portion of the air circulating through the air conditioning system 366 is heated in the solar heat collector 100 within the transverse hose 106, which has a large diameter suitable for moving air. The air conditioning system 366 includes a supply duct 368 supplying heated air from an air handling unit 364 within a structure and a return duct 370 returning air from within the structure to the air handling unit 364. A conventional heating system is provided for warming air moving through the air conditioning system 366, using, for example, a refrigerant moving through a line 369 including coils (not shown) within the air handling unit 364, with the refrigerant being heated by a reverse-cycle air conditioning compressor (not shown).

In the hybrid solar heat collector 100, air is circulated within the transverse hose 106, being moved from an outlet portion 194 by a fan unit 371 into a plenum 372 additionally receiving air from the return duct 370. For example, a curved plate 374 within the plenum 372 deflects air from the fan unit into the air handling unit 364. Preferably, the solar heat collector 100 additionally includes a first thermal sensor 378, sensing a temperature within the transverse hose 106, while the air conditioning system 366 includes a thermal sensor 380, sensing a temperature within the return duct 370. Output signals from these sensors 378, 380 are provided as inputs to a controller 382, which then, for example, operates the fan 371 so that air is moved into the plenum 372 from the outlet portion 194 of the transverse hose 106 only when it can heat the air being delivered through the return duct 370.

As shown in FIG. 13, within the second exemplary system 400, the transverse hose 106 is connected to a heat receiving structure 402 in the form of a system using a heated fluid, such as hot water, for heating a structure (not shown), including a heated fluid reservoir 404, in which a fluid heated by conventional means, such as electrical power or the combustion of oil or gas, and a number of heat exchangers 406 through which the heated fluid is circulated to heat various spaces within the structure. For example, the heat exchangers 406 may include baseboard heaters. A recirculation pump 408 is used to keep the fluid circulating through the heat exchangers 406 and into the reservoir 404, either through the transverse hose 106 with a first valve 410 open and a second valve 412 closed, or through a by-pass line 414 with the first valve 410 closed and the second valve 412 open. For example, a controller 416 controls operation of the valves 410, 412, in response to outlet signals from a thermal sensor 418 sensing a temperature within the transverse hose 106 and a thermal sensor 420 sensing a temperature within a fluid path 422 returning fluid from the heat exchangers 406.

As shown in FIG. 14, within the third exemplary system 430, the transverse hose 106 is connected to a provide heat within a generator 432 of an absorption air conditioning system 434. The transverse hose 106 is connected by tubes 434 through a recirculation pump 436 to a heat exchanger 438 within the generator 432. For example, the absorption cycle is driven by a thermal transfer fluid provided to the heat exchanger 438 at a temperature between 68 deg C. (155 deg F.) and 93 deg C. (200 deg F.), with the minimum temperature being determined by operation of the heating coils 146 within the reservoir 108, as described above in reference to FIG. 2, and with the maximum temperature being determined by changing the opacity of the dome structure 106, as described above in FIGS. 6-8. It is understood that heat applied to the fluid within the reservoir 108 is transferred within the hybrid solar heat collector 100 to an extent sufficient to maintain the minimum temperature within fluid flowing in the transverse hose 106. For example, within the absorption air conditioning system 434, a lithium bromide solution is pumped into the generator 434 through an inlet tube 440, and a concentrated solution is delivered to a heat exchanger and absorber through an outlet tube 442, with lithium bromide vapor additionally traveling from the generator 434 to a condenser 444.

While the exemplary systems 306, 400, 430 have each been described as heating water within the first fluid path 128 for use as domestic hot water, it is understood that the first fluid path may be filled with water or with another fluid, liquid or gas, to provide heat for another purpose, in combination with the use of a fluid flowing within the transverse hose 106 as described above in reference to FIGS. 12-14.

While the invention has been described with some degree of particularity, it is understood that various changes can be made without departing from the spirit and scope of thee invention, as described in the appended claims.

What is claimed is:

1. A solar heat collector comprising:
a floor;
a frame including a plurality of legs forming a first fluid flow path extending upward from the floor and inward, toward a central axis, wherein the plurality of legs are arranged in a circular pattern around the central axis, wherein the plurality of legs includes inner legs and outer legs, alternately disposed around the circular pattern;
a transverse hose including an inlet end facing outward from the solar heat collector for receiving an inward flow of a fluid, a central portion winding around the frame in a spiral pattern, wherein central portion extends outside each of the inner legs and inside each of the outer legs, and an outlet end facing outward from the solar heat collector for providing outward flow of the fluid; and
a translucent dome structure extending upward from the floor to surround an interior space including the frame and the transverse hose.

2. The solar heat collector of claim 1, wherein
the plurality of legs includes an inlet/outlet leg and a plurality of interconnected legs,
each of the legs includes first and second ends and a pair of tubes extending between the first and second ends of the leg;
the tubes within each of the interconnected legs are connected to one another at a first end of the interconnected leg;
a first tube within the inlet/outlet leg is connected to a tubular inlet section for inward flow of a fluid being circulated through the frame,
a second tube within the inlet/outlet leg is connected to a tubular outlet section for an outward flow of a fluid being circulated through the frame,
each tube within each leg is connected at a second end of the leg to a tube within an adjacent leg, forming the first fluid path extending between the tubular inlet section and the tubular outlet section.

3. The solar heat collector of claim 2, wherein
the first and second tubes within the inlet/outlet leg are connected to the tubular inlet section and the tubular outlet section at a lower end of the inlet/outlet leg,
the tubes within each of the interconnected legs are connected to one another at a lower end of the interconnected leg, and
each tube within each leg is connected to a tube within an adjacent end at upper ends of the legs.

4. The solar heat collector of claim 2, wherein the frame consists of straight tubular sections and right angle connectors attached to one another to form the first fluid path.

5. The solar heat collector of claim 2, wherein
an upper end of each outer leg is displaced outward from the central axis through a first distance,
a lower end of each outer leg is displaced outward from the central axis through a second distance,
an upper end of each inner leg is displaced outward from the central axis through a third distance, different from the first distance, and
a lower end of each inner leg is displaced outward from the central axis through a fourth distance, different from the second distance.

6. The solar heat collector of claim 2, additionally comprising:

a reservoir within the interior space, wherein heat from the reservoir is readily transferred throughout the interior space;

an intermediate tube connecting the tubular outlet section to the reservoir so that a fluid flows into the reservoir from the tubular outlet section;

a heater heating a fluid within the reservoir;

a temperature sensor causing the heater to heat the fluid in response to determining that a temperature of the fluid within the reservoir is below a first threshold level; and a tubular reservoir outlet section connected to the reservoir, extending outward from the interior space for an outward flow of fluid from the reservoir.

7. The solar heat collector of claim 1, wherein the translucent dome structure includes an inner dome, an outer dome, and a space extending between the inner and outer domes.

8. The solar heat collector of claim 1, wherein the translucent dome structure includes a variable opacity layer through which solar radiation is transmitted; and an opacity of the variable opacity layer is increased in response to an increase in temperature within the interior space and decreased in response to a decrease in temperature within the interior space.

9. The solar heat collector of claim 1, wherein the transverse hose includes an outwardly extending stiffening structure allowing the transverse hose to remain round while being bent sharply.

10. A solar heat collector comprising;

an exterior structure enclosing an interior space, wherein the exterior structure includes a translucent portion;

a first coiled tubular structure forming a first fluid path within the interior space, wherein a first fluid is circulated within the first fluid path to absorb heat resulting from solar radiation, a frame structure having a plurality of legs forming a second fluid path, the tubular structure being coiled such that it passes inside at least one leg and outside at least one leg and a variable opacity layer extending adjacent the translucent portion of the exterior structure, wherein an opacity of the variable opacity layer is increased in response to an increase in temperature within the interior space and decreased in response to a decrease in temperature within the interior space.

11. The solar heat collector of claim 10 wherein the variable opacity layer includes a translucent electrode extending along each side of a sublayer having an opacity changed in response to an electrical field established between the translucent electrodes, and the solar heat collector additionally comprises a thermal sensor, producing an outlet signal determined by a temperature within the interior space, and a switching circuit applying a voltage across the translucent electrodes in response to the outlet signal.

12. The solar heat collector of claim 10, wherein the variable opacity layer comprises a thermochromic coating.

13. The solar heat collector of claim 10, additionally comprising:

a reservoir within the interior space, wherein heat from the reservoir is readily transferred throughout the interior space, and wherein the first fluid path is connected to the reservoir so that the first fluid flows from the first fluid path into the reservoir;

a heater heating a fluid within the reservoir;

a temperature sensor causing the heater to heat the fluid in response to determining that a temperature of the fluid within the reservoir is below a first threshold level.

14. A system for providing hot water, wherein the system comprises:

an exterior structure enclosing an interior space, wherein the exterior structure includes a translucent portion;

a first tubular frame structure forming a first fluid path within the interior space, a reservoir within the interior space, wherein heat from the reservoir is readily transferred throughout the interior space, the reservoir being in fluid communication with the first tubular frame structure;

a heater heating a fluid within the reservoir;

a temperature sensor causing the heater to heat the fluid in response to determining that a temperature of the fluid within the reservoir is below a threshold level;

an inlet tube connecting the first fluid path to a water supply a second tubular structure wound spirally around the first tubular frame structure having a second flow path independent from the first flow path and in communication with a load to be heated; and an outlet tube connecting the first fluid path to at least one fixture dispensing hot water.

15. The system of claim 14, additionally comprising an anti-scald valve connecting the inlet tube to the outlet tube, wherein the anti-scald valve connects the inlet tube to the outlet tube when a temperature of water within the outlet tube exceeds a threshold level.

16. The system of claim 14, additionally comprising a variable opacity layer extending adjacent the translucent portion of the exterior structure, wherein an opacity of the variable opacity layer is increased in response to an increase in temperature within the interior space and decreased in response to a decrease in temperature within the interior space.

17. The system of claim 14, wherein the second fluid path is connected to a duct system circulating air within a air conditioning system in a structure, a portion of the air circulating within the air conditioning system is heated within the second fluid path.

18. The system of claim 14, wherein the second fluid path is connected to a fluid pumping system circulating a heated fluid through at least one heat exchanger within a structure, and a portion of the heated fluid is additionally heated within the second fluid path.

19. The system of claim 18, wherein the second fluid path is connected to transfer heat to a generator of an absorption air conditioning system.

* * * * *